W. E. DILSAVER.
ATTACHMENT FOR AUTOMOBILE WHEELS.
APPLICATION FILED NOV. 24, 1916.
1,249,350.
Patented Dec. 11, 1917.
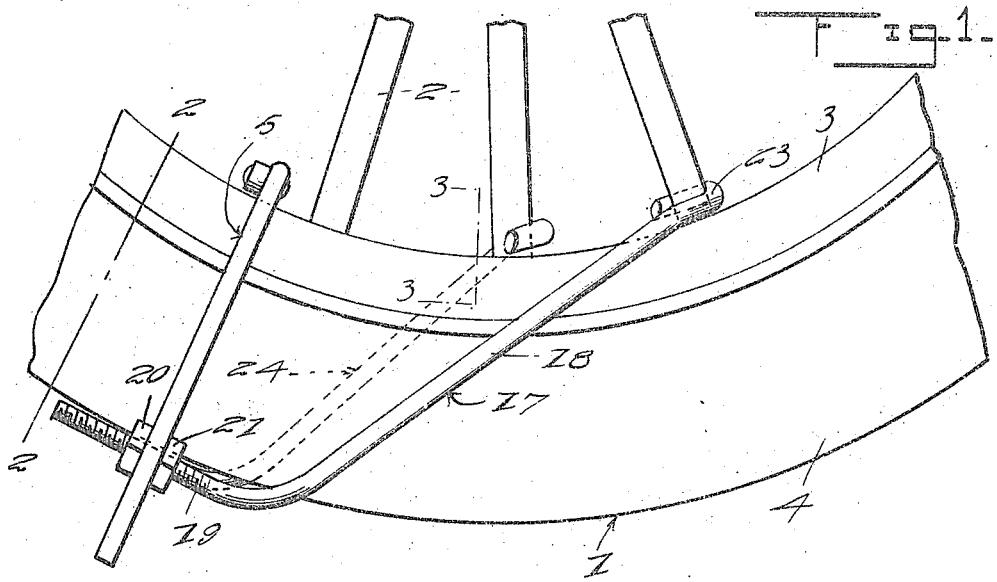
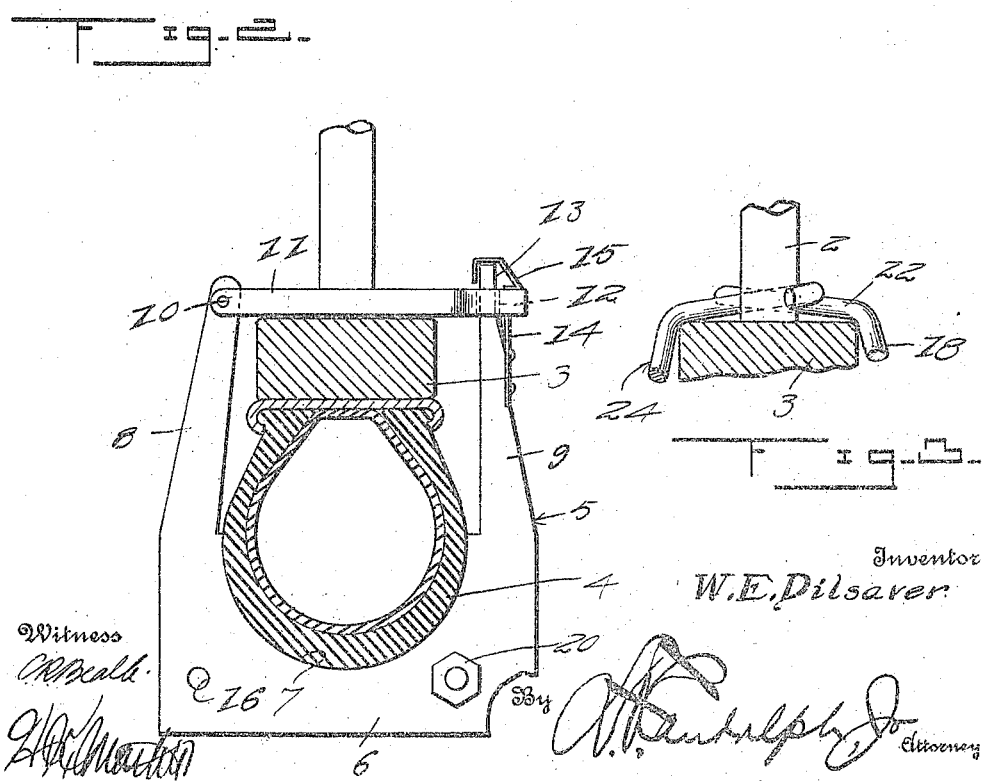
Inventor
W. E. Dilsaver

UNITED STATES PATENT OFFICE.

WILLIAM E. DILSAVER, OF SUPPLY, NORTH CAROLINA.

ATTACHMENT FOR AUTOMOBILE-WHEELS.

1,249,350.  Specification of Letters Patent.  Patented Dec. 11, 1917.

Application filed November 24, 1916. Serial No. 133,251.

*To all whom it may concern:*

Be it known that I, WILLIAM E. DILSAVER, a citizen of the United States, residing at Supply, in the county of Brunswick and State of North Carolina, have invented certain new and useful Improvements in Attachments for Automobile-Wheels; and I do hereby declare the following to be a full, clear, and exact description of the invention, such as will enable others skilled in the art to which it appertains to make and use the same.

This invention relates to new and useful improvements in attachments for automobile wheels and the principal object of the invention is to provide a device adapted to be attached to a tire in order to assist in pulling a vehicle out of mud, sand and the like.

Another object of the invention is to provide a plate which is adjustably attached to the wheel of the vehicle and which is so arranged that it may be easily removed and placed in a tool kit.

A further object of the invention is to provide a device which may be disassembled in order to occupy a minimum amount of space when being carried.

With these and other objects in view the invention consists in the novel combination and arrangement of parts which will be fully set forth in the following specification and accompanying drawing, in which:—

Figure 1 is a fragmentary side view of a vehicle wheel showing this attachment applied thereto.

Fig. 2 is a sectional view on line 2—2 of Fig. 1, and

Fig. 3 is a detail sectional view on line 3—3 of Fig. 1 showing the hooks attached to their spokes.

Referring to the drawing the numeral 1 designates as an entirety a wheel of an ordinary motor vehicle provided with the usual spokes 2 having attached to their outer ends the ordinary rim 3. The tire is designated by the numeral 4 and is secured to the wheel in the ordinary manner. The attachment is designated generally by the numeral 5 and will be more fully hereinafter described.

The attachment above referred to comprises a plate 6 having its inner edge provided with an arcuate recess 7 which is shaped to receive the tire 4. A pair of arms 8 and 9 extend inwardly from the edge of the plate 6 provided with the recess and in spaced relation as clearly shown in Fig. 2. Pivoted as at 10 to the inner end of the arm 8 is a link 11 provided at one end with the eye 12 for the reception of the inner end of the arm 9. The inner end of said arm 9 is provided with the inclined edge 13 against which the latch spring 14 actuates. This latch spring is provided near its inner end with the offset latch portion 15 which is adapted to engage the inner side of the eye 12 when the same is in place to firmly lock the link 11 in closed position as shown in Figs. 1 and 2.

Formed in the plate near its outer edge and adjacent its side edges are suitable openings 16 for the reception of the hooks which will be more fully hereinafter described. The long hook is designated generally by the numeral 17 and comprises a bar 18 provided at one end with an angularly extending portion 19 which is threaded and adapted to extend through one of the openings 16. A pair of nuts 20 and 21 are threaded on the portion 19 and form clamp nuts for engaging opposite sides of the plate 6 in order to hold the hook in the proper adjusted position. The opposite end of the rod 18 is provided with an angularly extending portion 22 having a hooked end 23 for engagement around a spoke of the wheel as clearly illustrated in Fig. 1.

Coöperating with the hook 17 is the hook designated generally by the numeral 24 which is constructed in a manner similar to the hook 17 except that it is shorter and is adapted to engage around the spoke adjacent the one around which the long hook engages and this hook 24 like the long hook 17 is held in place by a suitable adjusting nut.

It will be apparent from the foregoing that in use the device is placed in position by swinging the hooks laterally away from each other so as to disengage the wheel and opening the link 11 so that the device may be slipped into place as a yoke fitting over the tire. After the device has been placed in proper position the link 11 is swung outwardly and held in closed position as shown in Fig. 2 by means of the latch 14 thus firmly locking the device in place on the wheel. The hooks are then turned toward each other and by adjusting the nuts 20 and 21 it will be seen that the rods may be varied in order to bring the hook members 23 in proper place to engage the spokes and when in this position it will be seen that the plate 6 will be held against accidental movement. Upon rotating the wheel it will be seen that the plate 6 will form a paddle for engaging the mud, sand or soft earth in which the wheels will not bite and thus the vehicle may be moved to firmer ground where the device may be removed and replaced in the tool kit.

While in the foregoing there has been shown and described the preferred embodiment of this invention, it is to be understood that such changes may be made in the combination and arrangement of parts as will fall within the spirit and scope of the invention as claimed.

What is claimed is:—

1. A device of the class described including a plate, a pair of arms extending inwardly from one end of said plate to form a yoke, a link pivotally secured to the inner end of one of the arms and adapted to removably engage the opposite arm to completely encircle the tire and rim of a vehicle wheel for fastening the plate thereto, and means carried by said plate adapted to engage the spokes of a vehicle wheel to prevent the plate from changing its position with relation to the rim and tire.

2. A device of the class described comprising a plate, a pair of arms extending inwardly from the inner edge of the plate to form a yoke, a link pivoted to one of the arms and adapted to engage the opposite arm to completely encircle the tire rim of a vehicle wheel to hold the plate thereto, and adjustable means carried by the plate and adapted to engage the spokes of the wheel to prevent the plate from changing position with relation to the rim and tire.

In testimony whereof I affix my signature in presence of two witnesses.

WILLIAM E. DILSAVER.

Witnesses:
J. C. MINTZ,
GEO. H. GRAY.

Copies of this patent may be obtained for five cents each, by addressing the "Commissioner of Patents, Washington, D. C."